US007813833B2

(12) United States Patent
McNairy

(10) Patent No.: US 7,813,833 B2
(45) Date of Patent: Oct. 12, 2010

(54) AUTOMATED MAIL PREPARATION SYSTEM AND METHOD

(75) Inventor: Charles Felix Harvey McNairy, Washington, DC (US)

(73) Assignee: Walz Certified Mail Solutions, Inc., Temecula, CA (US)

( * ) Notice: Subject to any disclaimer, the term of this patent is extended or adjusted under 35 U.S.C. 154(b) by 1110 days.

(21) Appl. No.: 11/210,435

(22) Filed: Aug. 23, 2005

(65) Prior Publication Data

US 2007/0050317 A1 Mar. 1, 2007

(51) Int. Cl.
*G06F 7/00* (2006.01)

(52) U.S. Cl. ........................ 700/221; 209/584; 700/228

(58) Field of Classification Search ................. 209/584; 700/221, 213, 220, 225, 228
See application file for complete search history.

(56) References Cited

U.S. PATENT DOCUMENTS

| | | | | |
|---|---|---|---|---|
| 3,968,350 | A | 7/1976 | Watson | |
| 5,313,051 | A | 5/1994 | Brigida et al. | |
| 5,317,654 | A | 5/1994 | Perry et al. | |
| 5,325,303 | A | 6/1994 | Walz et al. | |
| 5,507,526 | A | 4/1996 | Petkovsek | |
| 5,573,277 | A | 11/1996 | Petkovsek | |
| 5,704,650 | A | 1/1998 | Laurash et al. | |
| 5,754,434 | A * | 5/1998 | Delfer et al. | 700/223 |
| 5,848,809 | A | 12/1998 | Petkovsek | |
| 5,898,153 | A * | 4/1999 | Lagan et al. | 235/375 |
| 6,039,242 | A * | 3/2000 | Tee | 229/92.1 |
| 6,089,612 | A * | 7/2000 | Tsamourgelis | 283/67 |
| 6,370,259 | B1 | 4/2002 | Hobson et al. | |
| 6,400,829 | B1 | 6/2002 | Petkovsek | |
| 6,560,602 | B1 * | 5/2003 | Carter | 707/10 |
| 6,676,794 | B1 | 1/2004 | Petkovsek | |
| 7,058,610 | B1 * | 6/2006 | Pintsov | 705/62 |
| 2003/0069862 | A1 | 4/2003 | Charroppin | |
| 2003/0115162 | A1 | 6/2003 | Konick | |
| 2003/0144973 | A1 | 7/2003 | Pintsov et al. | |
| 2003/0182155 | A1 | 9/2003 | Nitzan et al. | |
| 2004/0039715 | A1 | 2/2004 | Gullo | |
| 2004/0129767 | A1 * | 7/2004 | Fabel et al. | 229/300 |
| 2004/0149822 | A1 | 8/2004 | Stevens et al. | |
| 2005/0001021 | A1 * | 1/2005 | Hutchinson | 229/300 |

FOREIGN PATENT DOCUMENTS

| | | | |
|---|---|---|---|
| EP | 0 878 778 | A2 | 11/1998 |
| JP | 2003006297 | A | 1/2003 |

* cited by examiner

*Primary Examiner*—Gene Crawford
*Assistant Examiner*—Ramya Prakasam
(74) *Attorney, Agent, or Firm*—Gordon & Rees LLP

(57) ABSTRACT

A system for automatic preparation of mail pieces for special service mailing has a transport device for transporting a series of mail pieces such as envelopes one-by-one in a first path, each envelope having imprinted information. A scanner in the first path reads predetermined information off each envelope. Return receipts are simultaneously fed in a second path past at least one printer, the second path joining the first path at a junction after the printer. The scanner is linked directly to the printer so that the information read from an envelope is immediately applied by the printer to the return receipt, and the prepared return receipt is then secured to the envelope.

22 Claims, 8 Drawing Sheets

AUTOMATED MAIL PREPARATION SYSTEM AND METHOD

BACKGROUND OF THE INVENTION

The present invention relates to mail preparation systems and methods, and is particularly concerned with a system and method for preparing mail to be delivered using special services such as certified mail, registered mail, or other tracking or delivery confirmation services.

Post office special services such as certified mail, registered mail, insured mail and the like, allow a return receipt, also known as a "return receipt" to be affixed to an envelope or other piece of mail. The return receipt has a space for the recipient to insert their signature on delivery, and the return receipt is then mailed back to the sender as proof of delivery. Currently, such return receipt cards are often prepared manually and then affixed to the envelope by hand, using two lines of adhesive on opposite side edges of the card. This is time consuming, particularly for businesses which prepare multiple pieces of special service mail every day.

Some automated mail preparation systems have been proposed in the past which allow for reduction in the manual handling steps for this type of mail. These generally involve storage of information on a series of mail pieces, and retrieval of this information from storage in order to complete the return receipt, which is subsequently attached to the mailpiece.

SUMMARY OF THE INVENTION

It is an object of the present invention to provide a new and improved automated mail preparation system and method for special service mail including a return receipt.

According to one aspect of the present invention, a system for automated mail preparation is provided, which comprises a mail piece handling unit for handling a series of prepared mail pieces, each mail piece having a plurality of machine readable indicia, a transport device for transporting mail pieces from the handling unit in a predetermined first path, a scanner in the first path for reading at least some of the machine readable indicia from each mail piece, a return receipt transport device for feeding return receipts in a predetermined second path, at least one printer in the second path for printing information on the return receipt, the printer being connected to the scanner for directly receiving imaging information from the scanner based on the indicia read from each mail piece and printing the associated information in predetermined areas of a respective return receipt, the first and second paths joining at a junction after the printer, and an affixer at the junction between the first and second paths for affixing each printed return receipt to the respective mail piece from which the indicia were read by the scanner.

The machine readable indicia on the envelope which is read by the scanner may be in the form of alphanumeric indicia, such as the sender and recipient address printed on the mail piece, or may be in the form of a bar code, or both. For example, the scanner may comprise a camera or optical scanner using optical character recognition technology to read the actual alphanumeric names and addresses from an envelope, as well as a mail piece identifying number for tracking purposes, such as a certified or registered mail identification number. Alternatively, the scanner may also comprise a bar code reader for reading a bar code containing the mail piece identifying information. In an exemplary embodiment of the invention, each mail piece has imprinted sender indicia, addressee indicia, article identifying indicia, and a machine readable code containing at least the sender and addressee indicia or information, and the scanner is a code reader for reading the machine readable code.

The machine readable code may a 2D bar code or any type of bar code or other readable code for providing information in a relatively compact, machine readable format. The machine readable code may also contain the article identifying indicia and may further include a customer's internal data information for that particular piece of mail. The article identifying indicia may be pre-printed on the return receipt, so that the printer uses imaging information from the scanner to print the addressee and sender information on the return receipt. In another alternative arrangement, the sender address may also be pre-printed on each return receipt rather than being provided in the machine readable code for reading and printing on each return receipt in turn. However, in an exemplary embodiment of the invention, the machine readable code contains sender, addressee and article identifying information, and the printer uses the imaging information from the scanner to print the corresponding information at the appropriate positions on the return receipt before it is affixed to the corresponding mail piece.

The mail piece handling unit may be any suitable device such as a hopper or the like for receiving mail pieces and supplying them one by one to a transport device such as a conveyor belt.

The system may also comprise an initial printer for printing the machine readable code on the mail piece or a mailing label for the mail piece, as well as postage indicia. In one embodiment, the mail piece comprises a letter inserted in a window envelope, and the initial printer prints indicia in predetermined regions of a first sheet of the letter so that the indicia will appear in a window or windows of the envelope. A folder and inserter folds each letter with the first sheet uppermost and then inserts the letter in a window envelope so the indicia appear in the windows. A computer provides imaging data to the initial printer for printing a series of pieces of correspondence or letters. The imaging data may include a machine readable code containing all the information needed to subsequently image the return receipt, so that the scanner only has to read this code, rather than having to read separate alphanumeric codes and bar codes containing the same information.

In another embodiment, an initial printer prints the indicia on a mailing label or directly on an envelope. In the former case, the mailing label may be attached to an envelope or package prior to automated preparation of the return receipt.

In an exemplary embodiment of the invention, the prepared mail piece handling unit, envelope transport device, return receipt supply and transport device, the printer, and the return receipt affixer are all part of a separate, stand-alone machine for automatic preparation and affixing of return receipts to mail pieces. The mail pieces may be prepared locally or remotely, and then be accumulated and stacked in the mail piece handling unit, which may be a hopper or the like. This machine does not require any data storage of customer lists or the like for preparing the return receipts, but instead obtains all the necessary information directly from the piece of mail and applies it to the return receipt which is then immediately affixed to the same piece of mail.

According to another aspect of the present invention, a method of automatic preparation of mail pieces for special service mailing is provided, which comprises the steps of:

feeding a series of mail pieces one-by-one in a predetermined first path, each mail piece having predetermined identifying information;

reading at least part of the identifying information off each mail piece;

simultaneously feeding blank return receipts one-by-one in a predetermined second path past at least one printer, the second path joining the first path at a junction after the printer;

sending the information read from a respective mail piece to the printer;

using the information received at the printer to print corresponding information on a return receipt;

securing the printed return receipt to the respective mail piece from which the information was read; and repeating the code reading and return receipt printing and securing steps until all mail pieces in the series are ready for mailing.

In an exemplary embodiment of the invention, the information read from each mail piece is contained in a single machine readable code on the mail piece, the code containing at least the sender information and the addressee information. The machine readable code may also include article identifying information used for tracking purposes, such as a certified or registered mail identification number. The machine readable code may be a 2D bar code or other bar code, optical characters, or any other machine readable indicia.

In an exemplary embodiment of the invention, the code on each mail piece is a 2D bar code which has the capacity for containing a large amount of information, and is printed on a first sheet of a series of letters in a preliminary step at a predetermined position which will be located within one of the windows of a window envelope when the letter is subsequently folded and inserted in the envelope. A code reader for reading the code may be a camera, bar code reader or scanner. The 2D bar code may be positioned adjacent the addressee information on the mail piece, so as to be within the area of the window through which the addressee information appears when the piece of correspondence or letter is inserted in the envelope.

According to another aspect of the invention, the mail piece may include an address label for adhering to an envelope, rather than a first sheet carrying the information for appearing in windows of a window envelope. In this case, the address label is printed with the sender, addressee, return receipt code and second code, and then adhered to an envelope or package. The system and method is otherwise the same as described above.

This system avoids the need to retrieve information from data storage in order to print information on a return receipt. Instead, the necessary information is retrieved directly from the envelope to which the return receipt is to be affixed. This requires no additional verification step, since the information is not retrieved from data storage, where there is no guarantee that the information being retrieved corresponds to the envelope arriving at the return receipt affixer, particularly where there may have been a mistake in the order of feeding envelopes. The system and method of this invention is independent of envelope stacking order, since the information required to be imprinted on the return receipt is retrieved directly from the envelope to which the return receipt is to be affixed, immediately prior to attaching the return receipt to the envelope, without any intervening data retrieval step.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which.

DETAILED DESCRIPTION OF THE DRAWINGS

Figure 1:
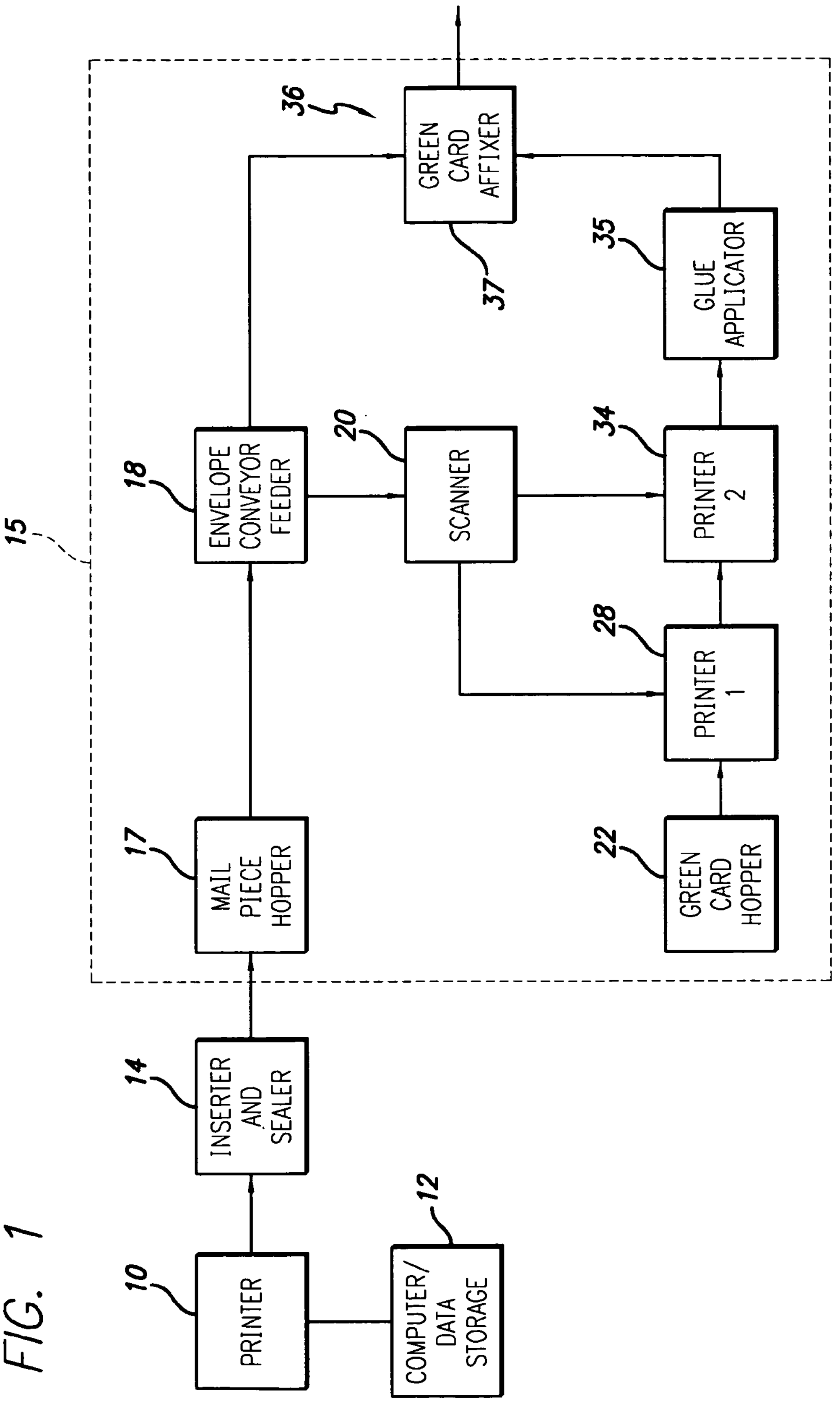
FIG. 1 is a block diagram of a mail preparation system according to an exemplary embodiment of the invention.
Figure 2:
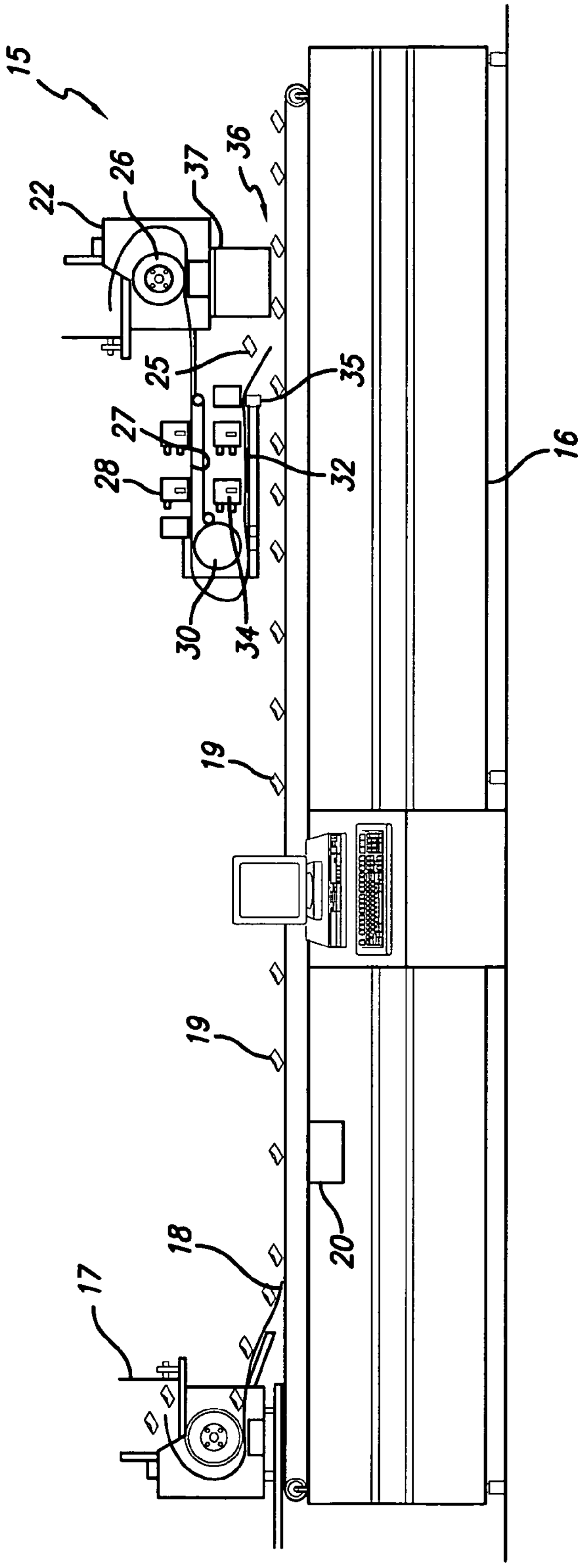
FIG. 2 is a side elevation view of a machine for printing return receipts and affixing them to envelopes.
Figure 3:
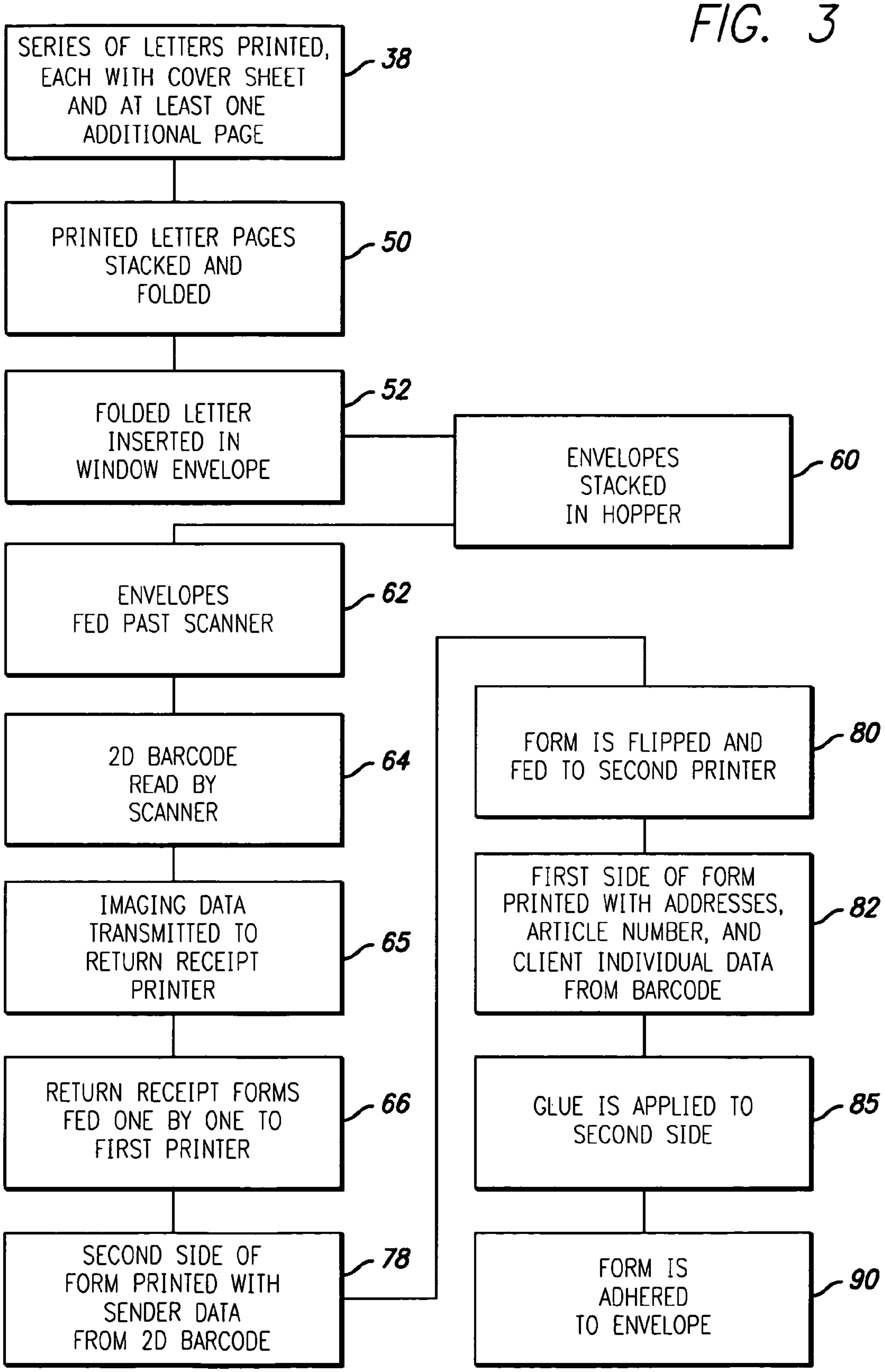
FIG. 3 is flow chart of the steps carried out in the system of FIG. 1.

FIGS. 1 to 3 of the drawings illustrate an automated mail preparation system and method according to an exemplary embodiment of the invention, while FIGS. 4 to 9 illustrate various parts of a mail piece during preparation in the system of FIGS. 1 to 3.

FIG. 1 is a block diagram of the system, which basically comprises a first printer 10 connected to a computer 12 having data storage containing names and addresses of customers, clients, or other individuals or businesses to which mail is to be sent, an inserter and sealer 14 of a conventional nature for folding and inserting completed letters or the like into envelopes and sealing the envelopes, and a return receipt preparation and affixing assembly or machine 15 in which return receipts are prepared automatically and secured to respective envelopes.

The return receipt preparation and affixing assembly or machine 15 is illustrated schematically in the block diagram of FIG. 1 and in more detail in FIG. 2. This machine is completely separate from the printer 10, computer 12, and folder/inserter 14, and these components may be located close to one another or at remote locations. The machine has a base 16 on which a mail piece hopper or mail piece handling unit 17 is mounted at one end for receiving a stack of prepared envelopes or other types of mail pieces. The handling unit may be any suitable device known in the field for handling mail pieces and feeding them to a transport device such as a conveyor or the like.

An envelope transport device or first conveyor belt 18 feeds the envelopes 19 one by one along a first path through the machine to an outlet at the opposite end of the base, the envelopes being oriented with their rear face upwards and the front face downwards. A scanner or code reader 20 is mounted downstream of the envelope handling unit 17 for reading predetermined information from the envelopes. A return receipt hopper or handling unit 22 is mounted in a housing 24 above the first path or conveyor 18, and return receipts 25 are fed one-by-one from the handling unit 22 in a second predetermined path around a first roller or drum 26, along a second conveyor belt 27 beneath a first printer 28, around second roller or drum 30, and along a third conveyor belt 32 past a second printer 34 and a glue applying unit 35. The third conveyor belt 32 meets the first conveyor belt 18 at a junction 36, at which each return receipt is affixed to the corresponding envelope by an affixer 37, which may be a pressure roller for pushing the return receipt down against the envelope. The completed mail pieces are then conveyed by the conveyor belt 18 to the exit end of the machine, where they may be collected in any suitable collector or basket. If desired, a verification step may be carried out downstream of the affixer 37, using a scanner or the like to read indicia from the envelope and the return receipt and compare the indicia to verify that the correct return receipt is applied to each envelope. However, verification should not normally be necessary, since each return receipt is prepared concurrently with the feeding of the envelope or mailpiece from which the information was read up to the junction where the return receipt meets the envelope.

Figure 4:
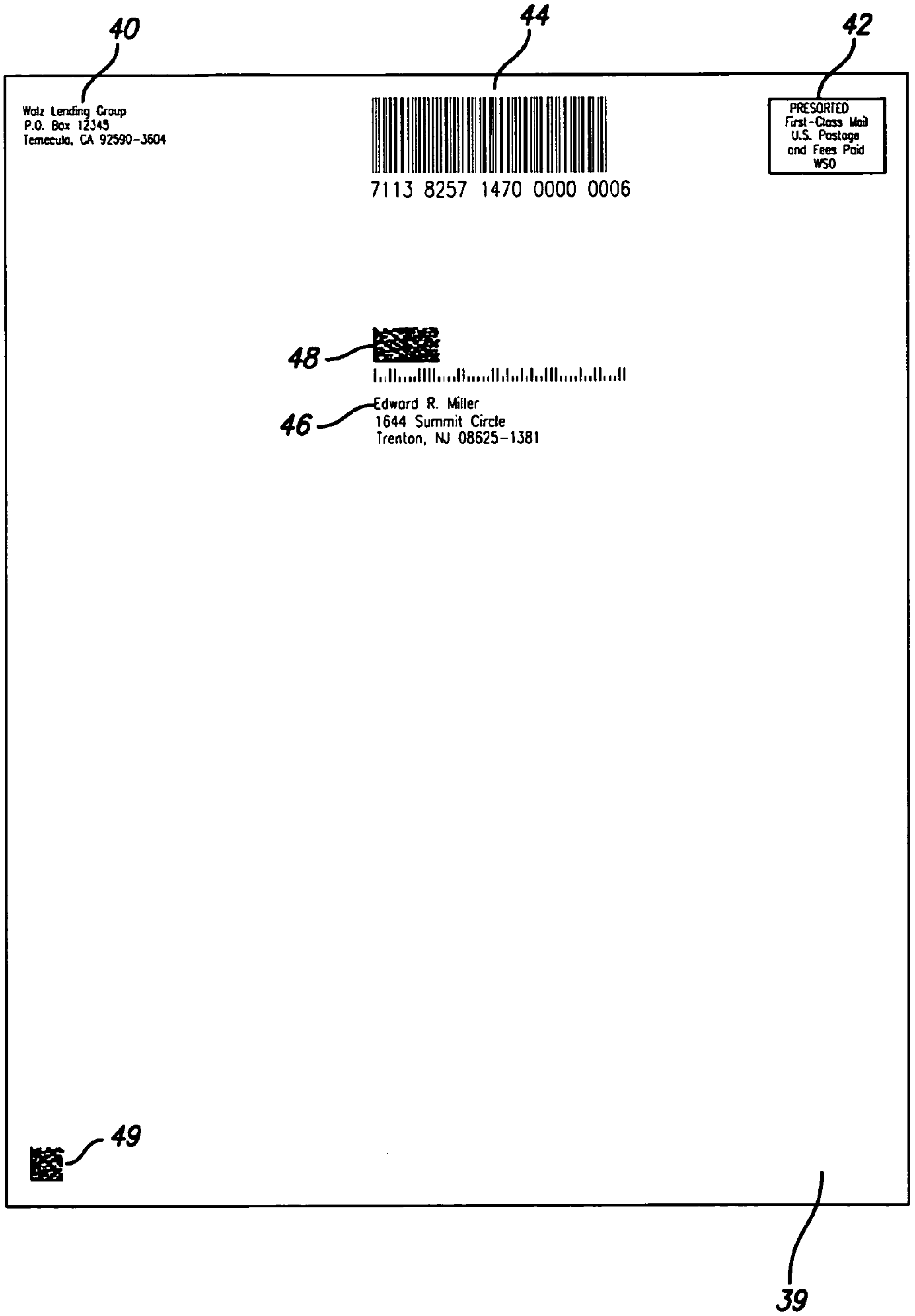
FIG. 4 is a front elevation view of a first sheet of a communication or piece of correspondence prepared by the printer of FIG. 1.

FIG. 3 is a flow diagram of the steps carried out by the system of FIGS. 1 and 2. In step 38, the initial printer 10 prints conventional information for a series of business mailings on a first sheet 39 of every letter or piece of correspondence, using information retrieved from the data base in computer 12, which may be a local or remote computer. In addition to the conventional information, the printer 10 is also controlled to print a code containing selected information regarding the mailing. The code may be a 2D barcode or other barcode, or any other machine readable code, Where the code is a 2D barcode, it is created using a known software font for creating such codes. FIG. 4 illustrates the first sheet of a piece of mail as printed by printer 10 under the control of computer 12. Most of the printed information is in the upper part of the sheet 39. Sender name and address information 40 is printed in a predetermined area on the upper left hand corner of sheet 39, and postage indicia 42 is printed in a predetermined postage area at the upper right hand corner. An article identification code 44 or article number (bar code and numeric code) is printed in a designated area between indicia 40 and 42. The addressee information (name and address) 46 is printed in a designated area below the return receipt code. This also includes an address bar code, i.e., the Postnet code for the address 46.

A second machine readable code 48, which may be a 2D bar code, is printed above the Postnet code. The second code 48 contains the addressee and sender information 40, 46, the article identification code or number 44, and may also include the internal reference or identification code of the sender for that particular piece of mail. The first sheet 39 also includes a smaller 2D bar code 49 in the lower left-hand corner, which includes the addressee name, sender's name, the document type, and the number of pages in the document. This is read by the inserter 14 (FIG. 1) and ensures that the inserter accumulates the correct number of pages for a given letter before folding and inserting them in an envelope. The same code may be provided at the same location on every page of the letter.

Printed letter pages are then stacked and folded, with the first sheet uppermost (step 50) and inserted in window envelopes (step 52). The stacker, folder and inserter detects the code on the first sheet of each letter or mailing to determine how many successive sheets must be stacked to complete that mailing. Once the correct number of sheets is accumulated, the stack is folded and inserted into an envelope 19, which is then sealed. Devices for automatically stacking, folding, and inserting letters into envelopes are well known in the field. The stack is inserted into the envelope such that information containing areas on the first sheet are aligned with windows on the front of the envelope 19, as best illustrated in FIG. 5.

Figure 5:
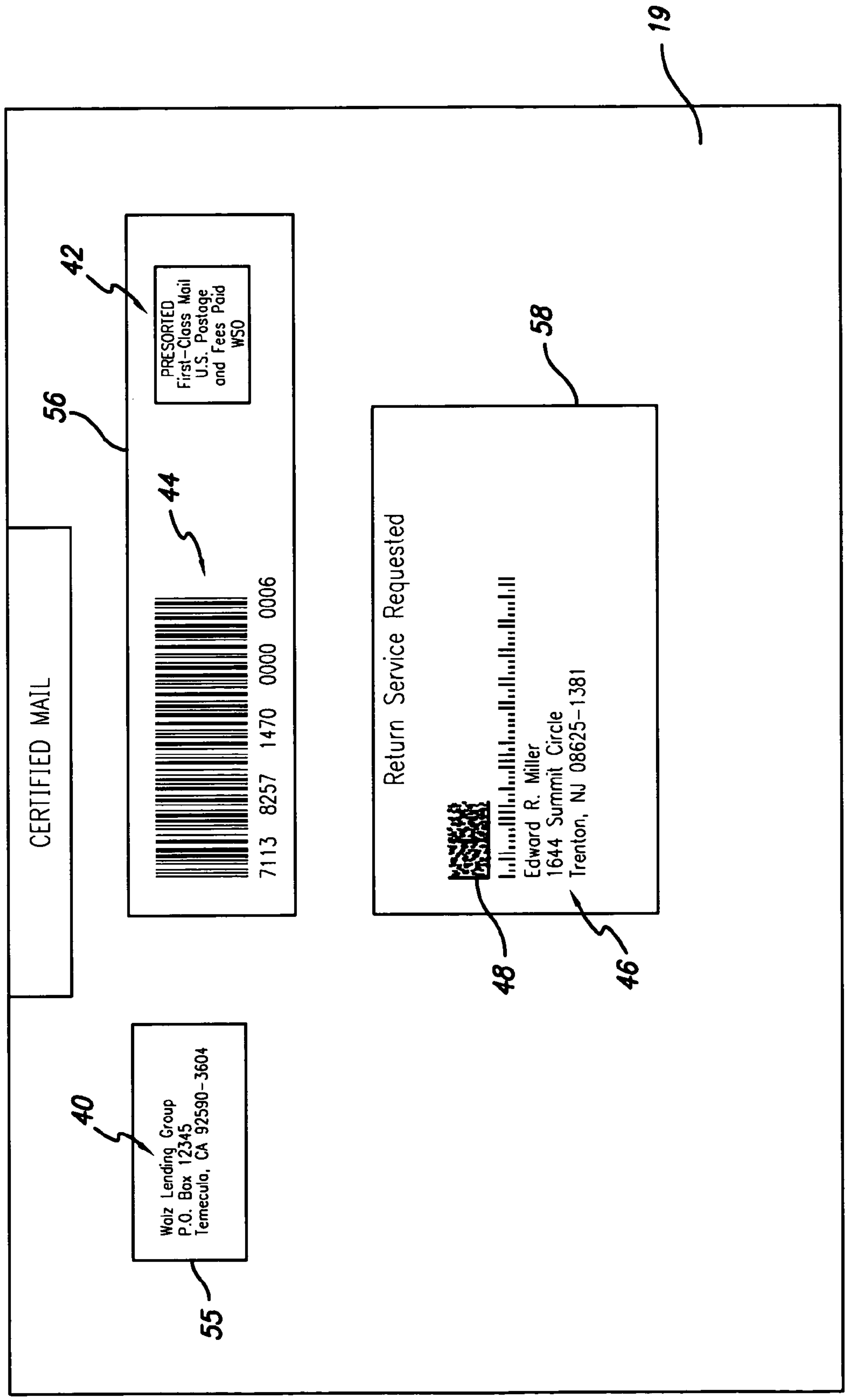
FIG. 5 is a front elevation view of an envelope into which the correspondence is inserted with the front sheet uppermost.

As can be seen in FIG. 5, the window envelope 19 has three windows. The first window 55 in the upper left corner is for revealing the sender name and address indicia 40. The second, longer window 56 aligned with window 55 reveals both the return receipt number and barcode 44 and the postage indicia 42. The third large window 58 beneath the second window reveals the addressee indicia 46 and the second code 48, in this case a 2 D bar code. It will be understood that other embodiments of the invention may have a different number or arrangement of windows, for example one large window area revealing all of the information, or two windows.

A completed stack of envelopes is removed from the inserter and stacked manually in the mail piece hopper or handling unit 17 in step 60, then envelopes are fed one by one onto the conveyor 18 and fed past the scanner 20 (step 62), the envelopes facing downwards and the scanner 20 facing upwardly to read the 2D bar code 48 from the front face of each envelope (step 64). The imaging data read from the envelope is transmitted to the return receipt printers 28 and 34 (step 65). Simultaneously with the reading of information on a respective envelope, a blank return receipt form is fed to the first printer 28 (step 66).

Figure 6:
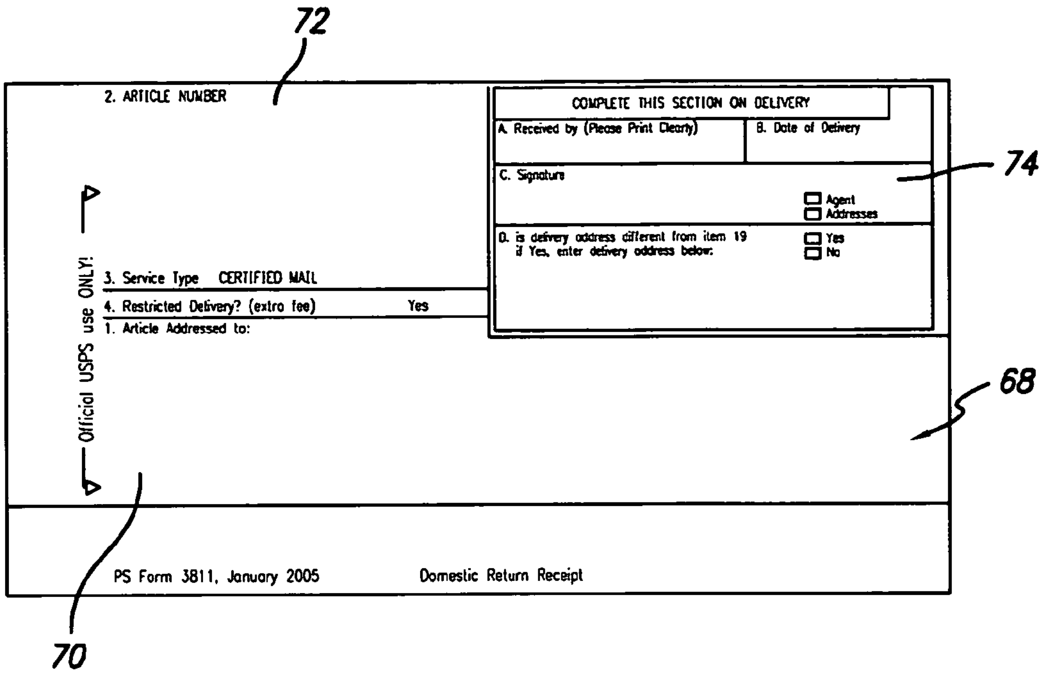
FIG. 6 is a front view of a blank return receipt prior to processing in the machine of FIG. 2.
Figure 7:
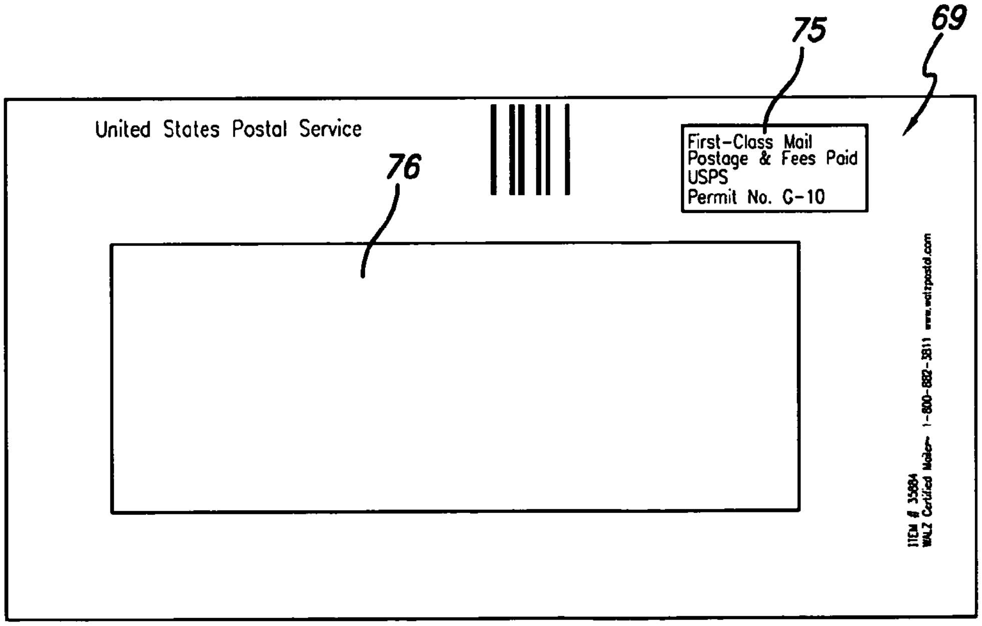
FIG. 7 is a rear view of the blank return receipt of FIG. 6.

The front face 68 of the blank return receipt form or card is illustrated in FIG. 6, and the rear face 69 is illustrated in FIG. 7. The form is a standard Post Office return receipt form [PS3811] for certified mail, insured mail, registered mail or the like, except that it has no strips of adhesive along opposite side edges of the rear face for securing to an envelope. The front face 68 has the standard areas 70 and 72 for receiving the addressee information and return receipt number, as well as the signature area 74 for signature by the recipient, and areas for date of delivery and the like. The rear face 69 carries postage indicia 75 and has an area 76 for receiving the sender name and address information.

Figure 8:
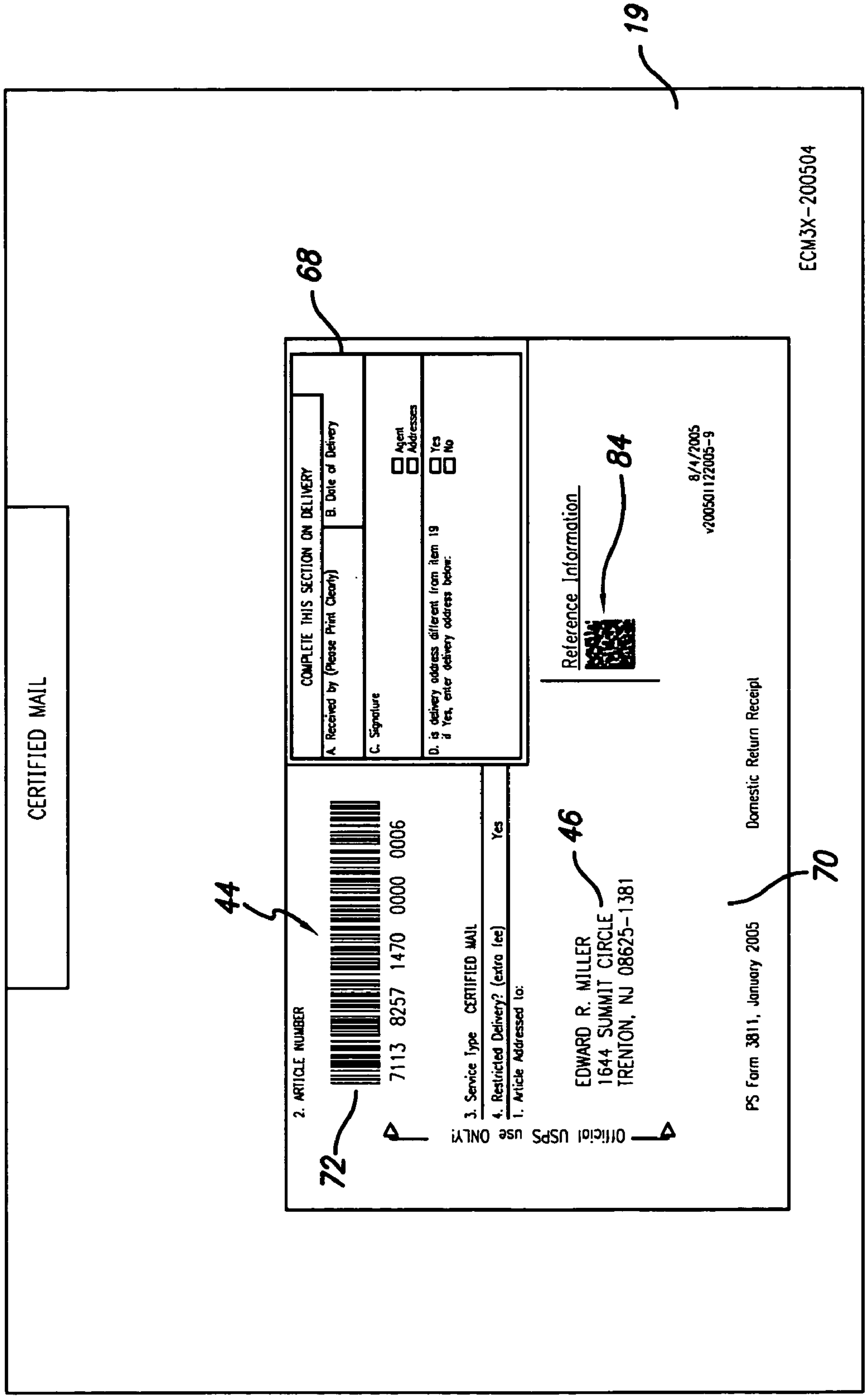
FIG. 8 is a front view of the return receipt of FIG. 6 applied to an envelope after printing of information in the machine of FIG. 2.
Figure 9:
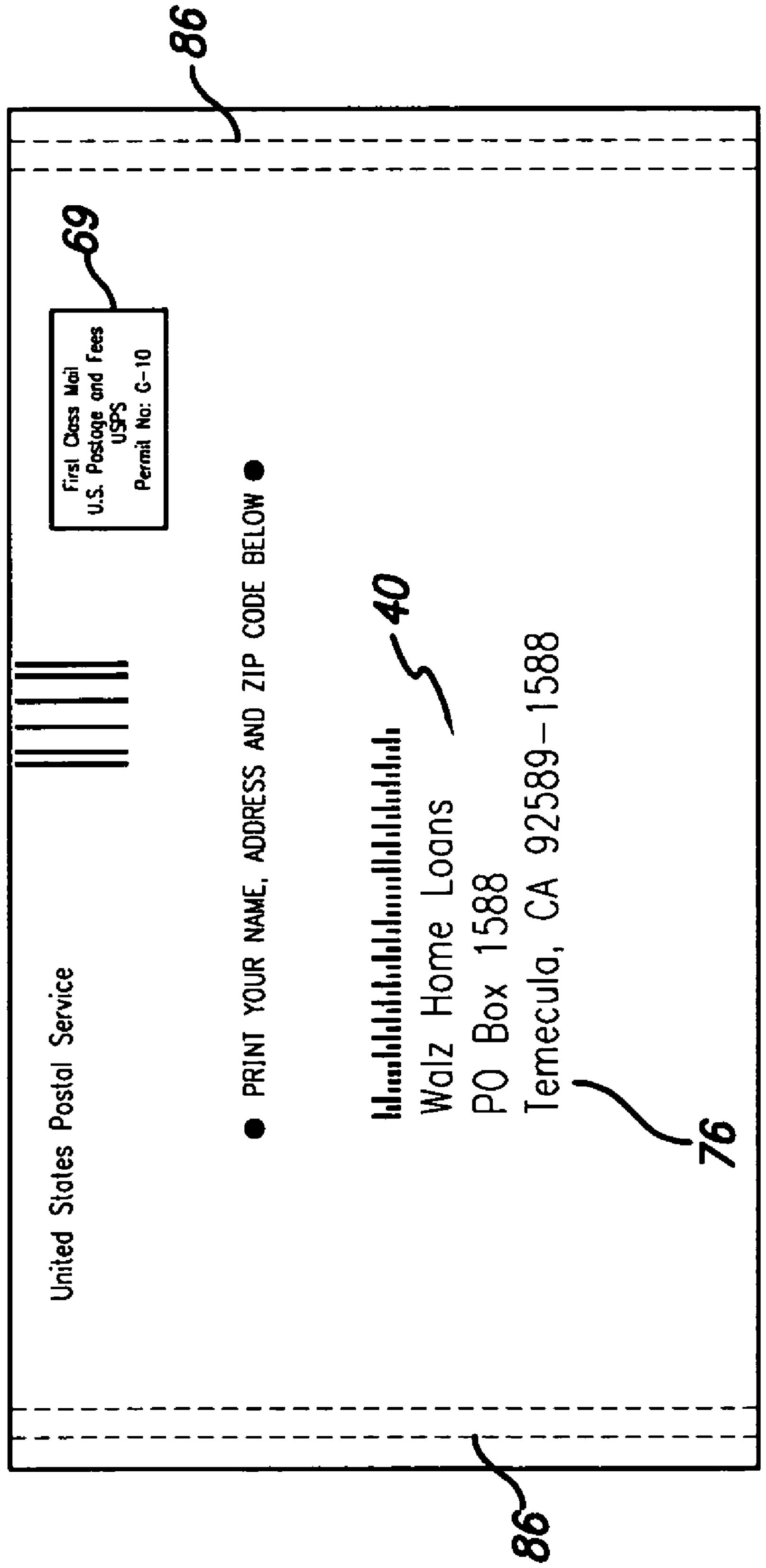
FIG. 9 is a rear view of the return receipt of FIG. 8 after printing is completed.

Each return receipt card 25 is fed past the first printer 28 (step 78), which may have one or two print heads, with the rear face 69 facing upwards, and the first printer prints the sender information 40 retrieved directly from the 2D bar code in area 76, as illustrated in FIG. 9. The form is then flipped over by roller 30 and dropped onto the lower conveyor 32 with the front face 68 facing upwards (step 80), and proceeds past the second printer 34. The second printer prints the addressee information 46 retrieved from the barcode in area 70 and the article number 44 in area 72 (step 82). Optionally, the second printer also prints reference information 84 as a 2D bar code in the blank area to the right of the addressee information, as indicated in FIG. 8. All of the information printed on the front face is also retrieved directly from the 2D bar code read from the envelope to which the return receipt is to be applied.

Although the information is printed on opposite faces of the return receipt by separate printers, with the card being flipped over between the printers, it may alternatively be printed simultaneously on the opposite faces by two opposing printers, for example. Additionally, the return receipts may be pre-printed with the article identifying code, in which case the printer or printers apply only the addressee and sender information to the return receipt. Return receipts may also be pre-printed with the sender information for a particular batch of mail pieces.

In step 85, glue is applied in strips 86 along opposite side regions of the rear face of the return receipt, using glue applicator 35 positioned below the conveyor 32. The conveyor 32 is then inclined downwardly to drop the prepared return receipt onto the envelope 19 beneath it at the junction between conveyors 32 and 18, with the rear face of the return receipt facing the rear face of the envelope. In step 90, applicator or affixer 37 presses the return receipt against the envelope so that the glue strips 86 adhere to the envelope. The envelope is now ready for mailing. This procedure is then repeated for each envelope in the hopper 17. This allows a plurality of letters to be prepared for special service mailing quickly, easily, and accurately.

In the method and system of this invention, the information for completing a return receipt is retrieved directly from the envelope or other mail piece to which the return receipt is applied, rather than from data stored in a computer. The latter procedure requires the envelopes to be fed in a specific order to ensure application of the correct return receipt to the corresponding envelope. In contrast, in the present invention, information is retrieved directly from the envelope itself and transmitted immediately to the printers which print the corresponding information on the return receipt, which is then applied to the same envelope.

Although an exemplary embodiment of the invention has been described above by way of example only, it will be understood by those skilled in the field that modifications may be made to the disclosed embodiment without departing from the scope of the invention, which is defined by the appended claims.

I claim:

1. A system for automated mail preparation, comprising:

a mail piece handling unit for handling a series of prepared mail pieces, each mail piece having a plurality of machine readable indicia;

a transport device for transporting mail pieces from the handling unit in a predetermined first path;

a scanner in the first path for reading at least some of the machine readable indicia from each mail piece, wherein the machine readable indicia comprises sender, addressee and article identifying information;

a return receipt transport device for transporting return receipts in a predetermined second path;

at least one printer in the second path for printing sender and addressee information on the return receipt, the printer being connected to the scanner for directly receiving imaging information from the scanner based on the sender and addressee information read from each mail piece by the scanner and printing the associated sender and addressee information in predetermined areas of a respective return receipt, wherein each return receipt is attached to a mail piece in the series of prepared mail pieces, and wherein the sender and addressee information for printing each of the return receipts is retrieved directly from each mail piece to which the return receipt is affixed rather than from data stored in a computer, and wherein no information is retrieved from data storage in order to print information on the return receipt, and such that all the information necessary to be printed on the return receipt is retrieved directly from the mail piece to which the return receipt is to be affixed immediately prior to attaching the return receipt to the mail piece, without any intervening data retrieval step;

the first and second paths joining at a junction after the printer; and an affixer at the junction between the first and second paths for affixing each printed return receipt to the respective mail piece from which the indicia were read by the scanner.

2. The system as claimed in claim 1, wherein each mail piece has indicia comprising a machine readable code containing at least the addressee information and the scanner comprises a reader for reading the machine readable code from each mail piece.

3. The system as claimed in claim 2, wherein the machine readable code contains article identifying information.

4. The system as claimed in claim 1, further comprising first and second printers in the second path for printing information on opposite faces of the return receipt, the first and second printers being connected to the scanner for directly receiving imaging information from the scanner based on the indicia read from each mail piece and printing the associated information in predetermined areas of a respective return receipt.

5. The system as claimed in claim 1, including an adhesive applicator for applying adhesive strips to the return receipt prior to the junction.

6. The system as claimed in claim 2, wherein the machine readable code additionally includes a customer's internal reference information for a particular piece of mail, and the reference information is also printed on the return receipt.

7. The system as claimed in claim 1, further comprising a preliminary printer for printing sender information, addressee information, article identifying information, and the corresponding machine readable code at predetermined locations on a series of mail pieces.

8. The system as claimed in claim 7, further comprising a controller linked to the preliminary printer for controlling information printed on the mail pieces, the controller having a data base containing mailing information for preparing the mail pieces.

9. The system as claimed in claim 8, wherein the controller comprises means for controlling the printer to print the machine readable code in a predetermined region of the first sheet of a series of letters, whereby the machine readable code will be visible through the window of a window envelope in which each letter is inserted.

10. The system as claimed in claim 2, wherein the machine readable code is a 2D bar code and the scanner is a bar code reader.

11. The system as claimed in claim 1, wherein a first and a second printer are provided in the second path, the return receipt transport device having a first portion for feeding return receipts past the first printer with a first face of each return receipt facing upwardly, a second portion for feeding the return receipts past the second printer with the second face of each return receipt facing upwardly, and a flip station between the first and second portions for flipping the return receipt over so that the second face faces upwardly.

12. The system as claimed in claim 1, further comprising a glue applicator for applying glue along opposite side edges of each return receipt prior to said junction, the affixer comprising means for pressing the return receipts against the respective mail pieces so that the glue adheres to the mail pieces.

13. A method of automatic preparation of mail pieces for special service mailing, comprising the steps of:

feeding a series of mail pieces one-by-one in a predetermined first path, each mail piece having predetermined identifying information, the predetermined identifying information comprising sender, addressee and article identifying information printed thereon;

using a scanner to read at least part of the identifying information off each mail piece;

simultaneously feeding blank return receipts one-by-one in a predetermined second path past at least one printer, the second path joining the first path at a junction after the printer;

sending the information read by the scanner from a respective mail piece to the printer;

using the information received at the printer to print sender and addressee information on a return receipt, wherein each return receipt is attached to a mail piece in the series of prepared mail pieces, and wherein the information read by the scanner for printing the sender and addressee information on each of the return receipts is retrieved directly from each mail piece to which the return receipt is affixed rather than from data stored in a computer, and wherein no information is retrieved from data storage in order to print information on the return receipt, and such that all the information necessary to be printed on the return receipt is retrieved directly from the mail piece to which the return receipt is to be affixed immediately prior to attaching the return receipt to the mail piece, without any intervening data retrieval step;

securing the printed return receipt to the respective mail piece from which the information was read; and repeating the information reading and return receipt printing and securing steps until all mail pieces in the series are ready for mailing.

14. The method as claimed in claim 13, wherein each mail piece has sender information, addressee information, an article identifying code, and a machine readable second code containing at least the addressee information, the step of reading at least part of the identifying information off each mail piece comprises reading the second code off each mail piece with a code reader, and the step of printing information on each return receipt comprises printing at least the respective addressee information on each return receipt.

15. The method as claimed in claim 14, wherein the machine readable second code contains the sender information and the article identifying code, and the step of printing information on each return receipt comprises printing the addressee information, sender information, and the article identifying code.

16. The method as claimed in claim 13, wherein first and second printers are located in the second path and information read from the mail piece is sent directly to both printers, and the step of using the information to print corresponding information on the return receipt comprises printing information on a first face of the return receipt at the first printer and printing information on a second face of the return receipt at the second printer.

17. The method as claimed in claim 14, wherein the second code is a bar code.

18. The method as claimed in claim 17, wherein the second code is a 2D bar code.

19. The method as claimed in claim 14, further comprising the preliminary steps of applying sender information, addressee information, an article identifying code, and a machine readable second code at predetermined locations on the first sheet of a series of letters, folding each letter with the first sheet uppermost, inserting the folded letters in window envelopes such that the information and codes appear in one or more windows of the respective envelope, and stacking the envelopes in an envelope handling unit prior to feeding the envelopes one-by-one from the supply in said predetermined first path.

20. The method as claimed in claim 19, wherein the machine readable second code is located adjacent the addressee information and is positioned to be visible in the same window as the addressee information.

21. The method as claimed in claim 16, wherein the step of feeding blank return receipts along the second path comprises feeding each return receipt with a first face facing upwardly past the first printer, flipping each return receipt over after the first printer, and subsequently feeding each return receipt with a second face facing upwardly past the second printer.

22. The method as claimed in claim 13, wherein the step of securing printed return receipts to corresponding mail pieces comprises first applying glue strips along opposite side edges of each return receipt and then adhering the glue strips to the respective mail pieces.

* * * * *